United States Patent [19]
Dickerson

[11] Patent Number: 5,339,456
[45] Date of Patent: Aug. 16, 1994

[54] METHOD AND CIRCUIT FOR NON-COOPERATIVE INTERFERENCE SUPPRESSION OF RADIO FREQUENCY SIGNALS

[75] Inventor: Roger W. Dickerson, Montgomery, Ohio

[73] Assignee: Xetron Corporation, Cinncinnati, Ohio

[21] Appl. No.: 806,053

[22] Filed: Dec. 11, 1991

[51] Int. Cl.⁵ .............................................. H04B 1/16
[52] U.S. Cl. .................................... 455/303; 455/311; 455/206
[58] Field of Search ............... 455/295, 296, 303, 304, 455/307, 206, 210, 305, 306, 308, 311

[56] References Cited
U.S. PATENT DOCUMENTS

| | | |
|---|---|---|
| 3,287,645 | 11/1966 | Baghdady . |
| 3,911,366 | 10/1975 | Baghdady . |
| 3,987,396 | 10/1976 | Kreger . |
| 4,051,438 | 9/1977 | Pickett et al. . |
| 4,087,750 | 5/1978 | Allen et al. . |
| 4,088,955 | 5/1978 | Baghdady . |
| 4,328,591 | 5/1982 | Baghdady ............................ 455/303 |
| 4,513,249 | 4/1985 | Baghdady ............................ 328/150 |
| 4,710,723 | 12/1987 | Pelchat et al. ....................... 455/296 |
| 4,878,251 | 10/1989 | Richardson ........................... 455/304 |
| 4,920,348 | 4/1990 | Baghdady ............................ 342/433 |
| 4,998,289 | 3/1991 | Rabe et al. ............................ 455/33 |

*Primary Examiner*—Reinhard J. Eisenzopf
*Assistant Examiner*—Chi Pham

[57] ABSTRACT

This invention provides a method and circuit for separating a signal of interest from an angle modulated interfering signal in which a composite signal, including the signal of interest and the interfering signal, is used to produce first and second signals, the first signal being representative of the composite signal and the second signal being representative of the envelope of the composite signal. Selected components are removed from the second signal to produce a filtered signal. The filtered signal is mixed with the first signal, to produce an output signal including a component representative of the signal of interest having a greater spectral power density than other components of the output signal.

17 Claims, 4 Drawing Sheets

METHOD AND CIRCUIT FOR NON-COOPERATIVE INTERFERENCE SUPPRESSION OF RADIO FREQUENCY SIGNALS

BACKGROUND OF THE INVENTION

This invention relates to methods and circuits for separating a radio frequency signal of interest from a co-channel interfering signal, and to receivers which employ such methods and circuits.

In the reception of radio frequency signals, a situation is frequently encountered in which a weak signal of interest (SOI) is subject to interference by a strong interfering signal having a frequency band which encompasses that of the SOI. The interfering signal may be, for example, a jamming signal or a commercial radio or television signal. One type of signal of interest is a digital subcarrier that broadcasts digital audio beneath a commercial radio broadcast. The separation of the SOI from the undesired interfering signal under these conditions is not achievable with standard linear or frequency selective filter networks.

Various techniques such as phase and amplitude cancellation systems and steerable null antenna systems have been used to attempt to separate a signal of interest from an interfering signal. Such systems require multiple antenna apertures, accurate phase and gain matching, and/or geographic separation of the signal of interest source and the interfering signal source.

Certain conditions may provide a sample of the undesired interfering signal which can be algebraically subtracted from the composite signal to expose the desired signal of interest. This is feasible only if three conditions are met. First, the sample of undesired interfering signal must be corrected for amplitude, phase and group delay. Second, the sample must have a noise floor less than the desired signal of interest. Finally, the sample must have a make-up, in amplitude or phase, different from that of the composite signal in order to avoid cancelling the signal of interest. Where a sample of undesired interfering signal of sufficient quality is unavailable, this technique cannot be used.

The present invention seeks to provide a method and apparatus for detecting a radio frequency signal of interest in the presence of an interfering radio frequency signal when a sample of the interfering signal is unavailable, without requiring multiple antenna apertures, accurate phase and gain matching, and/or geographic separation of the signal of interest source and the interfering signal source.

SUMMARY OF THE INVENTION

A circuit for separating a radio frequency signal of interest from an interfering signal, constructed in accordance with this invention comprises a circuit for producing first and second signals, the first signal being representative of a composite signal and the second signal being representative of the envelope of the composite signal, wherein the composite signal includes the interfering signal and the signal of interest; a filter for removing selected components from the second signal to produce a filtered signal; and a first mixer for mixing the filtered signal with the first signal, to produce an output signal including a component representative of the signal of interest having a greater spectral power density than other components of the output signal.

In a first embodiment of the invention, the circuit for producing the first and second signals includes a logarithmic amplifier and detector which produces the first and second signals.

The second signal includes a plurality of components, one of the components being a cross product of the signal of interest and the interfering signal. The filter passes a filtered signal including the cross product of the signal of interest and the interfering signal with the first signal, to the first mixer which mixes the filtered signal with the first signal to produce the output signal.

In a second embodiment of the invention, the means for producing the first and second signals includes a processor which produces the first signal and a second mixer for mixing the first signal with the composite signal to produce the second signal.

Here again, the second signal includes a plurality of components, one of the components being a cross product of the signal of interest and the interfering signal. The second signal is filtered and the resulting filtered signal is passed to the first mixer which mixes the filtered signal with the first signal, to produce the output signal. This invention further includes radio frequency receivers which include one of the above circuits in their intermediate frequency stage.

The invention also encompasses the signal detection method performed by the above circuits, comprising the steps of: producing first and second signals, the first signal being representative of a composite signal and the second signal being representative of the envelope of the composite signal, wherein the composite signal includes a signal of interest and an interfering signal; removing selected components from the second signal to produce a filtered signal; and mixing the filtered signal with the first signal, to produce an output signal including a component representative of the signal of interest having a greater spectral power density than other components of the output signal. The second signal may be produced by using a circuit for producing a signal representative of the envelope of the composite signal, such as a logarithmic amplifier, or by mixing the composite signal with the first signal. In the output signal, the spectral power density of the signal of interest relative to the remainder of the output signal is significantly greater than the spectral power density of the signal of interest relative to the interfering signal in the composite signal.

BRIEF DESCRIPTION OF THE DRAWINGS

The invention will become more readily apparent to those skilled in the art through the following description of the preferred embodiments thereof, as illustrated in the drawings, wherein.

DESCRIPTION OF THE PREFERRED EMBODIMENTS

Circuits constructed in accordance with this invention provide non-cooperative suppression of high-level interference signals to enhance the detection of a co-channel low-level signal of interest (SOI). In this context, non-cooperative suppression refers to suppression of an interfering signal which does not require a reference sample of the interfering signal. The invention operates on an interference corrupted signal to produce an enhanced version of the desired SOI. Circuits constructed in accordance with this invention can be readily retrofitted within the intermediate frequency (IF) stage of existing receiver systems.

Figure 1:
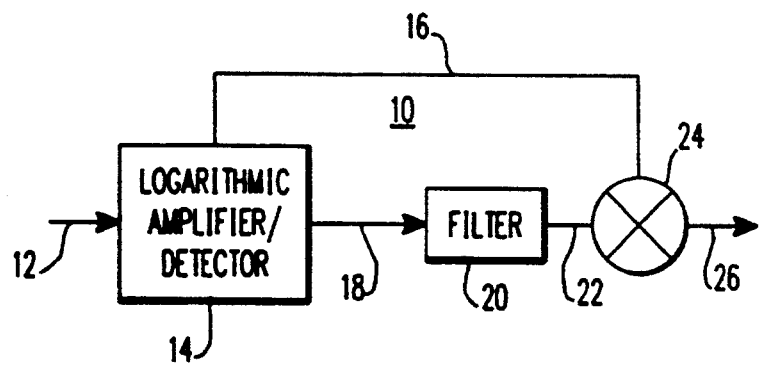
FIG. 1 is a block diagram of an interference suppression circuit constructed in accordance with a first embodiment of this invention.

Referring to the drawings, FIG. 1 is a block diagram of an interference suppression circuit 10 constructed in accordance with a first embodiment of this invention. A composite signal, including both an angle modulated interfering signal (I) and a signal of interest (SOI) is supplied to the interference suppression circuit 10 by way of input line 12. A logarithmic amplifier and detector circuit 14 produces a first signal on line 16 which is an amplitude limited signal that is representative of the composite signal, and a second signal on line 18 which is representative of the envelope of the composite signal. The second signal is filtered by filter 20 and a resulting filtered signal on line 22 is mixed (multiplied) with the first signal by a mixer 24 to produce an output signal which includes the signal of interest on line 26. To minimize distortion and leakage problems, the signal on line 22 is maintained at a substantially constant level.

Figure 2:
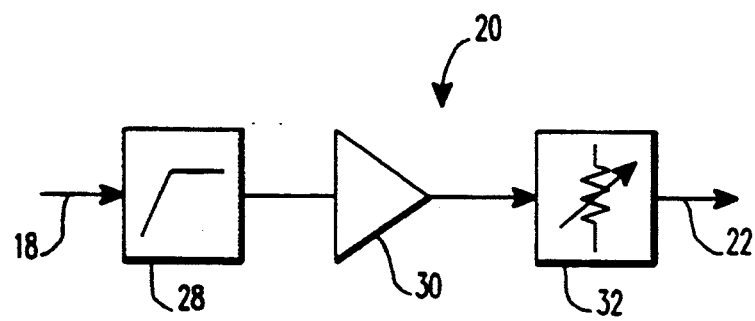
FIG. 2 is a block diagram of a filter circuit for use in the circuit of FIG. 1.

FIG. 2 is a block diagram of a filter circuit which may serve as the filter 20 in FIG. 1. Since typical logarithmic amplifiers contain circuits which reject the summed frequency terms in the second signal, low pass filtering may not be required. A high pass filter 28 passes selected components of the signal on line 18 to an amplifier 30. An attenuator 32 serves to limit the output of the amplifier 30 to keep the output within the dynamic range of the mixer 24. In an alternative filter circuit, the attenuator could be eliminated by using a controlled gain amplifier. In another alternative filter circuit, amplifier 30 may be replaced with a logarithmic limiting amplifier 34 which produces an output signal which is within the dynamic range of the mixer 24, thereby again eliminating the need for an attenuator.

Figure 3:
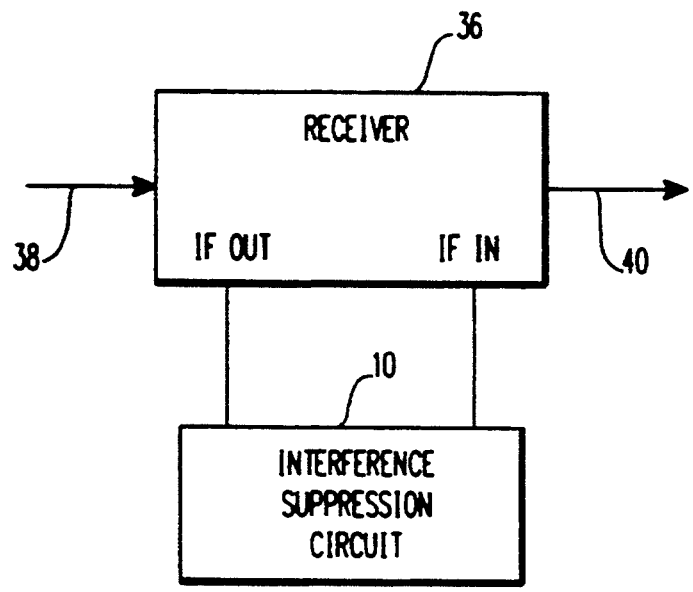
FIG. 3 is a block diagram of a radio receiver which incorporates the interference suppression circuit of FIG. 1.

FIG. 3 is a block diagram of a receiver system which incorporates the interference suppression circuit of FIG. 1. The receiver system includes a receiver 36 having an input 38 for receiving a radio signal from an antenna and an output 40 for connection to a speaker. The receiver converts the received radio frequency signals to an intermediate frequency (IF) in accordance with well known technology. The IF signals are then passed to the interference suppression circuit 10, which suppresses the interfering signal and returns the IF signal to the IF stage of the receiver. Signal capture circuits within the receiver can then easily extract the signal of interest from the modified IF signal. In the case of a wideband interfering signal, the suppression is achieved directly by virtue of the relative bandwidths of the interfering signal and the SOI. With a very modest frequency separation, superior adjacent channel rejection can be achieved despite the fact that the third order interference product (at a doubled frequency separation) is of equal magnitude to the desired signal. Most radio frequency receivers can be easily modified to incorporate the present invention.

Figure 4:
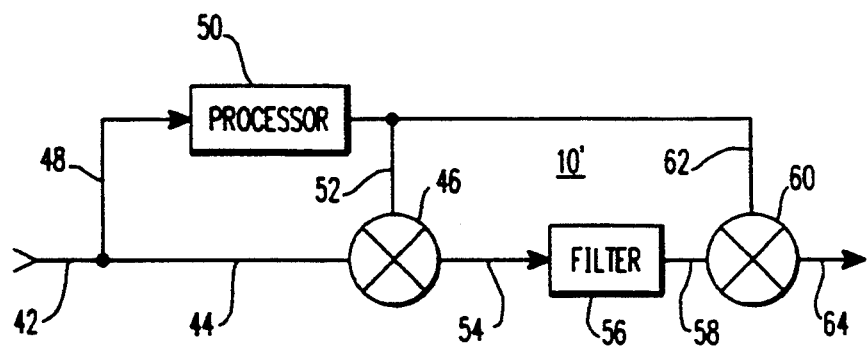
FIG. 4 is a block diagram of an interference suppression circuit constructed in accordance with a second embodiment of this invention.

FIG. 4 is a block diagram of an interference suppression circuit 10' constructed in accordance with an alternative embodiment of this invention. A composite signal, including both an angle modulated interfering signal (I) and a signal of interest (SOI) is supplied to the interference suppression circuit 10' by way of input line 42. Line 44 transmits the composite signal to a first mixer 46. Line 48 transmits the composite signal to a processor 50 which produces a first signal having a constant amplitude and preserves the phase of the carrier of the interfering signal. The first signal is delivered to the first mixer by way of line 52. The output of the mixer is a second signal, which is a linear representation of the input composite signal, and includes signal components which are centered about the sum and difference of the frequencies of the mixed signals. As a result of the homodyne architecture of the circuit, in which the composite signal is mixed (multiplied) with a signal representative of itself, the output of mixer 46 on line 54 is an composite signal which includes components corresponding to the cross-products of: the interfering signal with itself (I×I) centered at both zero frequency and at twice the carrier frequency of the interfering signal; the signal of interest with itself (SOI×SOI) centered at both zero frequency and twice the carrier frequency of the signal of interest; and the interfering signal with the signal of interest (I×SOI) centered at both zero frequency and the sum of the carrier frequencies of the interfering signal and the signal of interest. Processor 50 in FIG. 4 may be a broadband amplifier or a string of amplifiers whose phase response is centered about zero or 180 degrees.

The compound signal on line 54 is filtered by a filter 56 to produce a filtered signal on line 58. In the preferred embodiment, the filter removes the components of the compound signal which correspond to the cross-products of: the interfering signal with itself (I×I) centered at both zero frequency and at twice the carrier frequency of the interfering signal; and the interfering signal with the signal of interest (I×SOI) centered at both zero frequency and the sum of the carrier frequencies of the interfering signal and the signal of interest. Since the signal of interest is assumed to have an amplitude which is smaller than the interfering signal, the component of the compound signal which corresponds to the cross product of the signal of interest with itself (SOI×SOI) is considered to be insignificant. The filtered signal is then supplied to a second mixer 60 which mixes it with the composite signal supplied to the second mixer by way of line 62. The output 64 of the second mixer then includes components representative of the cross-products of: twice the interfering signal with the signal of interest and the signal of interest (I×I×SOI). At this point, the amplitude of the output signal component representative of the cross-products of the signal of interest with itself has a greater spectral density than that of the output signal component representative of twice the cross product of the interfering signal with the signal of interest. Therefore, the signal of interest can be injected into the intermediate stage of an associated receiver and easily detected by known receiver circuits.

Figure 5:
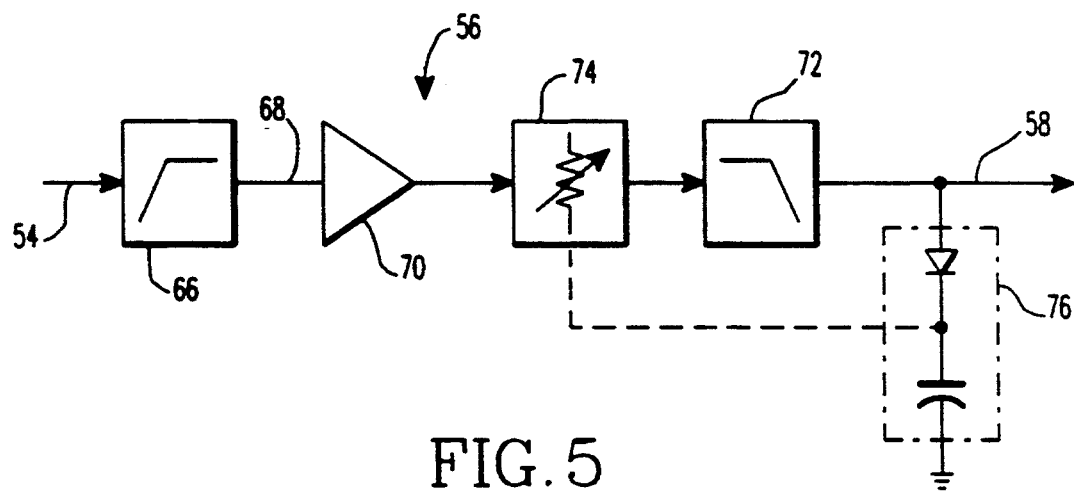
FIG. 5 is a block diagram of a filter circuit for use in the circuit of FIG. 4.

FIG. 5 is a block diagram of one embodiment of the filter 56 of FIG. 4. In this embodiment, filter 56 is shown to include a high pass filter 66 which removes low frequency components from the signal on line 54 to produce a signal on line 68 which is amplified by amplifier 70 and passed to a low pass filter 72 by way of an attenuator 74. The low pass filter is selected to pass signals having frequencies less than one half of the bandwidth of the interfering signal plus one half of the bandwidth of the signal of interest, and to reject signals having frequencies greater than or equal to two times the carrier frequency of the interfering signal. A detector 76 detects the signal on line 58 and controls the operation of the attenuator 74 to keep the level of the signal delivered to mixer 60 within the dynamic range of that mixer. If the interfering signal is intermittent, filter 66 must reject pulses which occur when the interfering signal is turned on. Therefore, the transient response of filter 66 is selected to reject changes in amplitude of the interfering signal.

Figure 6:
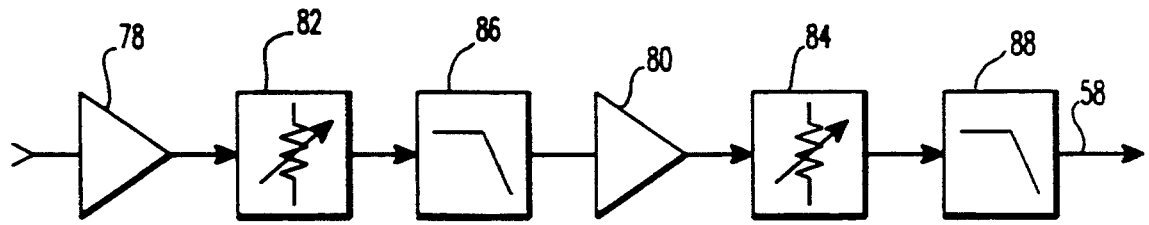
FIG. 6 is a block diagram of a circuit which can be used as the low pass filter depicted in FIG. 4.

FIG. 6 is a block diagram of a circuit which may be used in place of the filter 72 and attenuator 74 depicted in FIG. 5. In some applications of this invention it may be desirable to construct low pass filter 72 and attenuator 74 out of a chain of amplifiers 78 and 80, attenuators 82 and 84, and low pass filters 86 and 88 as shown in FIG. 6.

Figure 7:
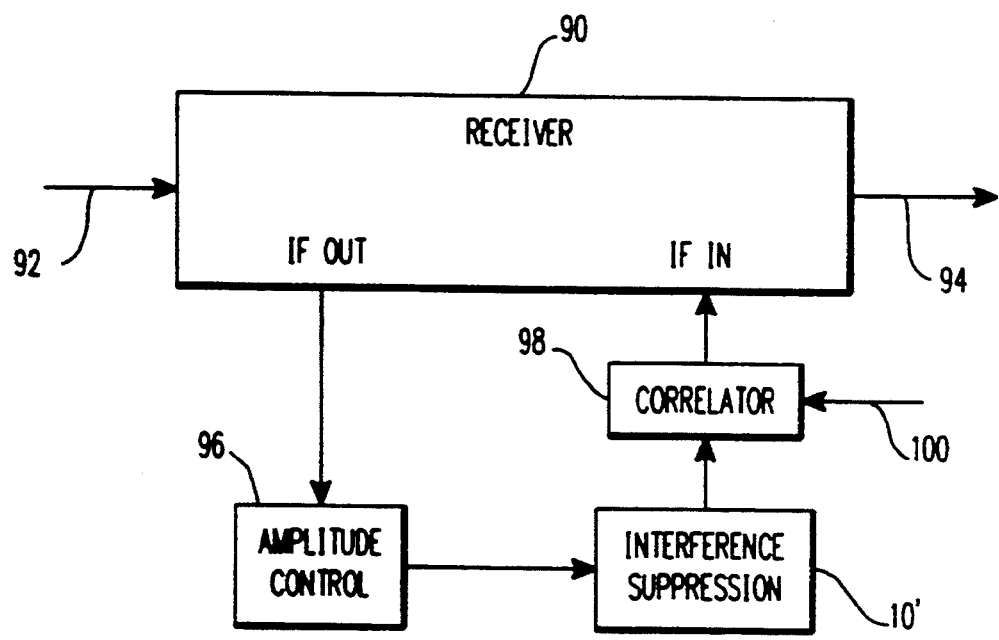
FIG. 7 is a block diagram of a radio receiver which incorporates the interference suppression circuit of FIG. 4.

FIG. 7 is a block diagram of a receiver system which incorporates the interference suppression circuit of FIG. 4. The receiver system includes a receiver 90 having an input 92 for receiving a radio signal from an antenna and an output 94 for connection to a speaker. The receiver converts the received radio frequency signals to an intermediate frequency (IF). The IF signals are then passed to an amplitude leveler 96 which controls the signal level into the interference suppression circuit. The interference suppression circuit suppresses the interfering signal and returns the IF signal to the IF stage of the receiver. In the case of a wideband interfering signal, the suppression is achieved directly by virtue of the relative bandwidths of the interfering signal and the SOI. With a very modest frequency separation, superior adjacent channel rejection can be achieved despite the fact that the third order interference product (at a doubled frequency separation) is of equal magnitude to the desired signal. Most radio frequency receivers can be easily modified to incorporate the present invention. If the signal of interest is a spread spectrum signal, a correlator 98 and control input 100 may be inserted as shown.

Figure 8:
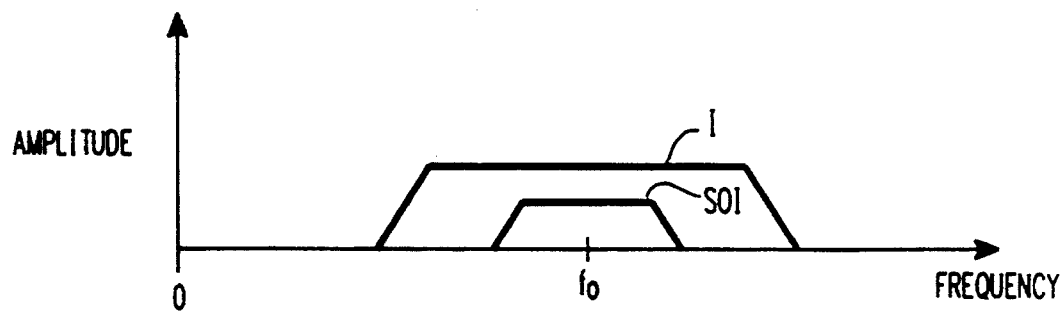
FIGS. 8, 9, 10 and 11 are a series of schematic waveform diagrams which illustrate the operation of the interference suppression circuits of FIGS. 1 and 4.

The operation of the above circuits can be explained by initially assuming that the interfering signal (I) has a constant envelope with a bandwidth and amplitude greater than that of the desired SOI, and completely overlapping the desired SOI as illustrated in FIG. 8. In FIGS. 8-11, I represents the interfering signal and SOI represents the signal of interest. The combination of these two signals is the composite signal. To perform the signal suppression method of this invention, first the composite signal is mixed (multiplied) with a signal which is representative of the composite signal.

Figure 9:
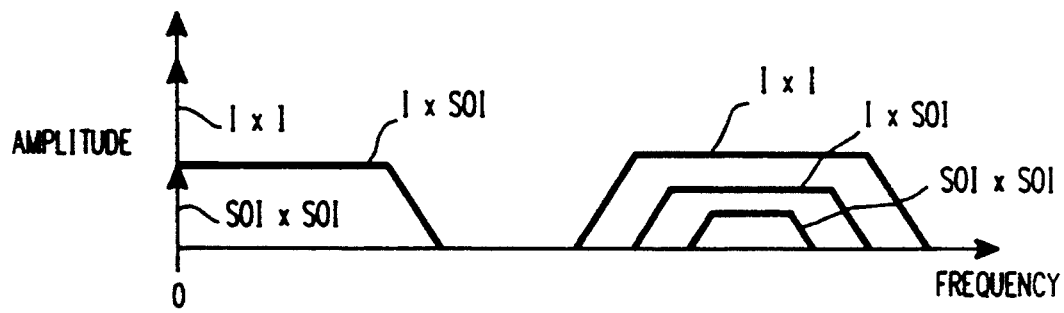
Figure 10:
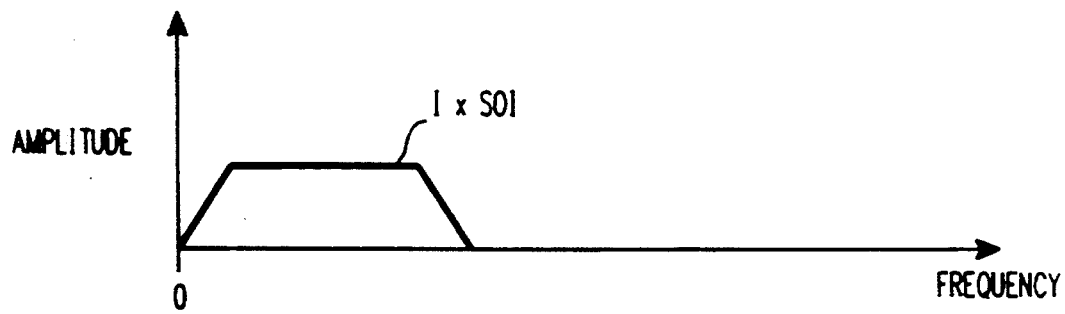
Figure 11:
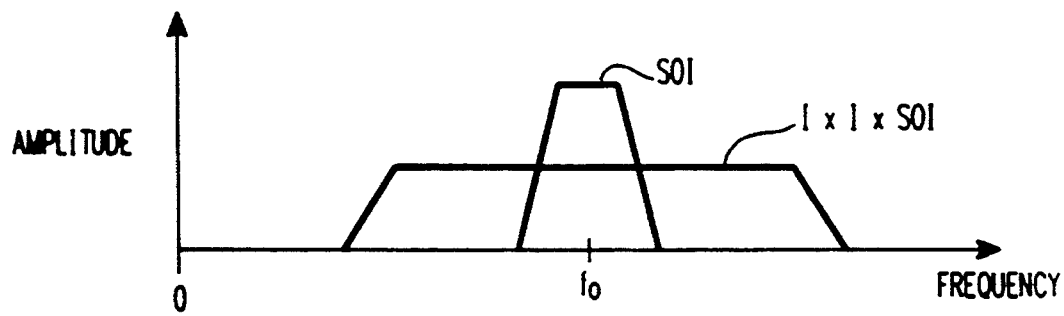

The mixing process generates cross-products of the form $I \times I$, $SOI \times SOI$, and $I \times SOI$, as shown in FIG. 9. The resulting sum terms are easily removed with a simple filter. Only the difference terms remain and are of interest. Since the interfering signal is assumed to be of much greater amplitude, the $SOI \times SOI$ cross-product has a relatively low magnitude and is insignificant. Further, the $I \times I$ difference term appears as a carrier, since the interference is assumed to have a constant envelope (angle modulation only), and is again easily removed with a low-pass filter to obtain the filtered signal shown in FIG. 10. The bandwidth of the remaining term is approximately twice the sum of the bandwidths of the individual I and SOI signals. This remaining cross-product is then mixed again with the original composite signal thereby stripping the interfering signal cross modulation. Neglecting non-ideal mixer characteristics, such as local oscillator isolation, the terms remaining after this operation comprise two signals with significant amplitude. Some simple trigonometric manipulation will show the first term to be effectively a third order intermodulation product of the form $(2 \times I \times SOI)$, while the second term is the SOI itself, as shown in FIG. 11. Since the terms are equal in total power, the effective signal-to-interference ratio in the bandwidth of the desired signal is $(1+2(B_I/B_{SOI}))$, assuming that the I and SOI overlap in frequency. Further note, however, that if I and SOI do not overlap, the third order "interference" product is separated from the SOI by twice the initial frequency separation.

The above description assumes that the interference signal was both constant envelope and of significantly greater bandwidth than the desired signal. If the SOI is a spread spectrum signal, the interference suppression gain adds to the processing gain of a subsequent correlator or matched filter, thereby enhancing the interference rejection properties of the overall system. Note that under no conditions, can the invention suppress interference which is equivalent to additive white Gaussian noise.

It should be apparent that this invention can enable the interception of low-level signals of interest in the presence of strong interference. It is also useful for the suppression of co-site/co-channel interference in tactical and strategic communications systems.

Although the invention has been described in terms of its preferred embodiments, it will be apparent to those skilled in the art that various changes may be made without departing from the scope of the invention. It is therefore intended that the appended claims cover such changes.

What is claimed is:

1. A circuit for separating a radio frequency signal of interest from an interfering signal, said circuit comprising:

means for receiving a composite signal and for producing first and second signals, said first signal being representative of the composite signal and said second signal being representative of the envelope of the composite signal, wherein the composite signal includes the interfering signal and the signal of interest;

means for removing selected components from the second signal to produce a filtered signal; and a first mixer for mixing the filtered signal with the first signal, to produce an output signal including a component representative of the signal of interest having a greater spectral power density than other components of the output signal.

2. A circuit for separating a radio frequency signal of interest from an interfering signal according to claim 1, wherein said means for producing first and second signals comprises:

a logarithmic amplifier and detector.

3. A circuit for separating a radio frequency signal of interest from an interfering signal according to claim 1, wherein said means for producing first and second signals comprises:
   a processor for receiving said composite signal and for producing said first signal; and
   a second mixer for mixing said composite signal with said first signal to produce said second signal.

4. A circuit for separating a radio frequency signal of interest from an interfering signal, according to claim 3 wherein said processor comprises:
   an amplifier having an output phase response centered around either zero degrees or 180 degrees.

5. A circuit for separating a radio frequency signal of interest from an interfering signal, according to claim 1, wherein said means for removing selected components from said second signal comprises:
   a highpass filter, an amplifier, an attenuator and a low pass filter connected in series with each other.

6. A circuit for separating a radio frequency signal of interest from an interfering signal, according to claim 1, wherein said means for removing selected components from said second signal comprises:
   means for removing components of said second signal other than a cross product of the signal of interest and the interfering signal.

7. A circuit for separating a radio frequency signal of interest from an interfering signal, according to claim 6, wherein said means for removing components of said second signal other than said cross product of the signal of interest and the interfering signal comprises:
   a first filter for removing components of said second signal centered at the sum of the frequencies of said signal of interest and the interfering signal; and
   a second filter for removing a component of said second signal representative of the cross product of said interference signal with itself.

8. A radio frequency receiver comprising:
   means for receiving a radio frequency signal, said radio frequency signal including a signal of interest and an interfering signal;
   means for converting said radio frequency signal into an intermediate frequency composite signal;
   means for producing first and second signals, said first signal being representative of said intermediate frequency composite signal and said second signal being representative of the envelope of said intermediate frequency composite signal;
   means for removing selected components from the second signal to produce a filtered signal;
   a first mixer for mixing the filtered signal with the first signal, to produce an output signal including a component representative of the signal of interest having a greater spectral power density than other components of the output signal; and
   means for extracting said signal of interest from said output signal.

9. A radio frequency receiver according to claim 8, wherein said means for producing first and second signals comprises:
   a logarithmic amplifier and detector.

10. A radio frequency receiver according to claim 8, wherein said means for producing first and second signals comprises:
   a processor for receiving said composite signal and for producing said first signal; and
   a second mixer for mixing said composite signal with said first signal to produce said second signal.

11. A radio frequency receiver, according to claim 10 wherein said processor comprises:
   an amplifier having an output phase response centered around either zero degrees or 180 degrees.

12. A radio frequency receiver, according to claim 8, wherein said means for removing selected components from said second signal comprises:
   a high-pass filter, an amplifier, an attenuator and a low-pass filter connected in series with each other.

13. A radio frequency receiver, according to claim 8, wherein said means for removing selected components from said second signal comprises:
   means for removing components of said second signal other than a cross product of the signal of interest and the interfering signal.

14. A radio frequency receiver according to claim 13, wherein said means for removing components of said second signal other than said cross product of the signal of interest and the interfering signal comprises:
   a first filter for removing components of said second signal centered at the sum of the frequencies of said signal of interest and the interfering signal; and
   a second filter for removing a component of said second signal representative of the cross product of said interference signal with itself.

15. A method of separating a radio frequency signal of interest from an interfering signal said method comprising the steps of:
   receiving a composite signal, wherein the composite signal includes the interfering signal and the signal of interest;
   producing first and second signals, said first signal being representative of the composite signal and said second signal being representative of the envelope of the composite signal;
   removing selected components from the second signal to produce a filtered signal; and
   mixing the filtered signal with the first signal, to produce an output signal including a component representative of the signal of interest having a greater spectral power density than other components of the output signal.

16. A method according to claim 15, wherein said step of removing selected components of said second signal comprises the steps of:
   removing components of said second signal centered at the sum of the frequencies of said signal of interest and the interfering signal; and
   removing a component of said second signal representative of a cross product of said interference signal with itself.

17. A method of processing radio frequency signals, said method comprising the steps of:
   receiving a radio frequency signal, said radio frequency signal including a signal of interest and an interfering signal;
   converting said radio frequency signal to an intermediate frequency composite signal;
   producing first and second signals, said first signal being representative of said intermediate frequency composite signal and said second signal being representative of the envelope of said intermediate frequency composite signal, wherein the intermediate frequency composite signal includes the interfering signal and the signal of interest;

removing selected components from the second signal to produce a filtered signal;

mixing the filtered signal with the first signal, to produce an output signal including a component representative of the signal of interest having a greater spectral power density than other components of the output signal; and extracting said signal of interest from said output signal.

* * * * *